(12) United States Patent
Gonzalez Hernandez et al.

(10) Patent No.: US 9,199,681 B2
(45) Date of Patent: Dec. 1, 2015

(54) MODULAR PARKING PLACE FOR BICYCLES

(71) Applicant: EMAÚS BILBAO, SCIS, Bilbao (ES)

(72) Inventors: Irene Gonzalez Hernandez, Basauri (ES); Susana Blanco Trueba, Getxo (ES); Victor Furundarena Moreno, Getxo (ES); José Ramón Vilariño Torreiro, Trapagaran (ES); José Manuel Gómez González, Bilbao (ES)

(73) Assignee: EMAÚS BILBAO, SCIS, Bilbao (ES)

( * ) Notice: Subject to any disclaimer, the term of this patent is extended or adjusted under 35 U.S.C. 154(b) by 0 days.

(21) Appl. No.: 14/397,024

(22) PCT Filed: Apr. 19, 2013

(86) PCT No.: PCT/ES2013/070251
§ 371 (c)(1),
(2) Date: Oct. 24, 2014

(87) PCT Pub. No.: WO2013/160509
PCT Pub. Date: Oct. 31, 2013

(65) Prior Publication Data
US 2015/0102714 A1    Apr. 16, 2015

(30) Foreign Application Priority Data
Apr. 27, 2012    (ES) .................................. 201200441

(51) Int. Cl.
*E04H 1/00*    (2006.01)
*B62H 5/00*    (2006.01)
(Continued)

(52) U.S. Cl.
CPC ................ *B62H 5/005* (2013.01); *A47B 81/00* (2013.01); *B62H 3/08* (2013.01); *B62H 3/10* (2013.01); *B62H 5/001* (2013.01); *E04H 6/005* (2013.01); *E05B 71/00* (2013.01)

(58) Field of Classification Search
CPC ............... B62H 2003/005; B62H 3/08; B62H 2700/00; B62H 5/005; B62H 3/10; B62H 5/001; E04H 6/005; B65D 2585/6862; A47B 81/00; E05B 71/00
USPC ............ 52/79.1, 79.2, 79.3, 79.4; 211/17, 20, 211/21, 22
See application file for complete search history.

(56) References Cited

U.S. PATENT DOCUMENTS 639,991 A * 12/1899 Jewell ................................ 410/3
3,949,528 A * 4/1976 Hartger et al. ................. 52/79.1
(Continued)

FOREIGN PATENT DOCUMENTS

ES    1 071 796 U    4/2010
FR    2188649 A6    1/1974
(Continued)

OTHER PUBLICATIONS

English translation of the International Preliminary report on patentability (Written Opinion) dated Sep. 2, 2013.

*Primary Examiner* — Basil Katcheves
*Assistant Examiner* — Joshua Ihezie
(74) *Attorney, Agent, or Firm* — Lucas & Mercanti, LLP (57) ABSTRACT

The present invention relates to a modular parking place for bicycles, formed by one or more compartments (2), each intended for housing a bicycle (1), each compartment (2) being formed by two sets of symmetrical profiles parallel to one another, between which a protective cover (3) is arranged on the upper portion and a door (4) is arranged on the front portion, while the lower portion of each compartment (2) has a longitudinal channel (5) for supporting and guiding bicycles (1), whereas the set of compartments (2) is closed by means of side cover plates (8) at the ends thereof.

8 Claims, 8 Drawing Sheets

(51) Int. Cl.
  *B62H 3/08* (2006.01)
  *E04H 6/00* (2006.01)
  *A47B 81/00* (2006.01)
  *B62H 3/10* (2006.01)
  *E05B 71/00* (2006.01)

(56) References Cited

U.S. PATENT DOCUMENTS

| | | | | |
|---|---|---|---|---|
| 3,967,425 | A * | 7/1976 | Wolverton et al. | 52/236.1 |
| 3,996,704 | A * | 12/1976 | Huey | 52/64 |
| 4,015,718 | A * | 4/1977 | Bernard | 211/5 |
| 4,438,606 | A * | 3/1984 | Chardon et al. | 52/79.1 |
| 4,442,961 | A * | 4/1984 | Bott | 224/570 |
| 4,506,786 | A * | 3/1985 | Buchanan et al. | 206/335 |
| 4,800,701 | A * | 1/1989 | Dunsworth | 52/66 |
| 5,265,385 | A * | 11/1993 | Smith et al. | 52/79.5 |
| 5,690,234 | A * | 11/1997 | Rhead et al. | 211/22 |
| 5,794,793 | A * | 8/1998 | Frederick | 211/20 |
| 5,833,074 | A * | 11/1998 | Phillips | 211/21 |
| 5,917,407 | A * | 6/1999 | Squire et al. | 340/432 |
| 5,988,403 | A * | 11/1999 | Robideau | 211/20 |
| 6,336,562 | B1 * | 1/2002 | Mori | 211/20 |
| 6,349,515 | B1 * | 2/2002 | Naudts | 52/234 |
| 7,021,474 | B2 * | 4/2006 | Garcia Simon et al. | 211/20 |
| 7,784,622 | B2 * | 8/2010 | Bernard | 211/20 |
| D689,011 | S * | 9/2013 | Isakov | D12/402 |
| D691,522 | S * | 10/2013 | Koepke | D12/115 |
| 8,820,004 | B1 * | 9/2014 | Jeffords | 52/79.4 |
| 2002/0095960 | A1 * | 7/2002 | Grover | 70/233 |
| 2007/0107322 | A1 * | 5/2007 | Blume | 52/79.4 |
| 2009/0107056 | A1 * | 4/2009 | Kirilichin et al. | 52/79.1 |
| 2013/0015145 | A1 * | 1/2013 | Koepke | 211/5 |
| 2015/0008197 | A1 * | 1/2015 | Blume | 211/20 |

FOREIGN PATENT DOCUMENTS

| | | |
|---|---|---|
| FR | 2872534 A1 | 1/2006 |
| NL | 9400633 A | 12/1995 |
| NL | 1012393 C | 12/2000 |
| NL | 1012393 C2 | 12/2000 |

* cited by examiner

MODULAR PARKING PLACE FOR BICYCLES

CROSS REFERENCE TO RELATED APPLICATION

This Application is a 371 of PCT/ES2013/070251 filed on Apr. 19, 2013 which, in turn, claimed the priority of Spanish Patent Application No. 201200441 filed on Apr. 27, 2012, both applications are incorporated herein by reference.

FIELD OF THE ART

The present invention relates to parking places used for storing bicycles in a safe and orderly manner, proposing a compact modular bicycle parking place formed by individual compartments, each intended for housing a single bicycle.

STATE OF THE ART

Social awareness concerning environmental issues has developed significantly in recent years, considerably increasing the use of bicycles as common means of transportation in large cities. The increase in the number of bicycles makes the presence of public spaces where these vehicles can be parked safely all the more necessary.

For this purpose, bicycle parking places formed by metal profiles of various shapes which are anchored to the ground and in which bicycles are secured by the wheel, frame or another portion thereof are known. In such parking places, bicycles are arranged in a disorderly manner, stacked on top of one another, such that handlebars or other portions of the bicycle get jammed together, which can cause damage. Furthermore, bicycles are exposed to the action of external meteorological agents such as rain, wind or snow, which can end up deteriorating them. Likewise, to prevent thefts, the user of the bicycle must anchor it to the parking place by means of a chain, lock or another fastening element.

On the other hand, cabin- or container-like parking places which allow storing bicycles individually, thus protecting them from adverse weather conditions and from theft or acts of vandalism, are also known. These solutions have the drawback of taking up too much space, a problem which is compounded in large cities where the large number of bicycles would make it necessary to provide large areas to build such individual parking places.

A parking place which allows storing bicycles individually in a safe and orderly manner in a small space, safeguarding them against external meteorological actions and from possible theft or acts of vandalism, is therefore necessary.

OBJECT OF THE INVENTION

According to the present invention, a modular parking place for bicycles is proposed which allows storing several bicycles individually in a small space, protecting them from external meteorological actions and from possible theft, acts of vandalism or other possible damage.

The modular parking place for bicycles object of the present invention has a structure which is formed by one or more compartments, each intended for housing a bicycle, each compartment having a protective cover and a front door for introducing the bicycle. A longitudinal channel for supporting and guiding the bicycle is arranged in the lower portion of each compartment, the set of compartments being closed at both ends by means of side cover plates.

Each compartment of the modular parking place is formed by two sets of symmetrical tubular profiles parallel to one another, where these sets of tubular profiles are attached to one another by means of transverse reinforcement bars. These transverse reinforcement bars are arranged perpendicular to the protective cover to provide it with rigidity.

The proposed modular parking place is scalable in width by means of coupling additional compartments in parallel. In this case, to prevent the handlebars of bicycles arranged in consecutive compartments from hitting against one another, two configurations for the longitudinal channels arranged in the lower portion of the compartments have been envisaged, i.e., longitudinal channels having an inclined ramp which allows lifting the front portion of the bicycle, and therefore the handlebar, and other longitudinal channels not having an inclined ramp. Therefore, a compartment with a longitudinal channel without an inclined ramp is arranged between every two compartments with longitudinal channels with an inclined ramp, such that the handlebars of the bicycles in every two consecutive compartments are at different heights, handlebars being prevented from hitting against one another.

Another possible configuration to prevent the handlebars of bicycles from hitting against one another is to use longitudinal channels with inclined ramps of different heights, therefore between every two compartments with longitudinal channels with an inclined ramp, there is arranged another compartment with a longitudinal channel but with an inclined ramp having a different height with respect to the inclined ramps of the adjacent compartments.

A modular parking place is thus obtained which, due to its constructive and functional features, is of preferred application for its intended application in relation to individual bicycle storage in a small space and in a safe manner.

DETAILED DESCRIPTION OF THE INVENTION

Figure 1:
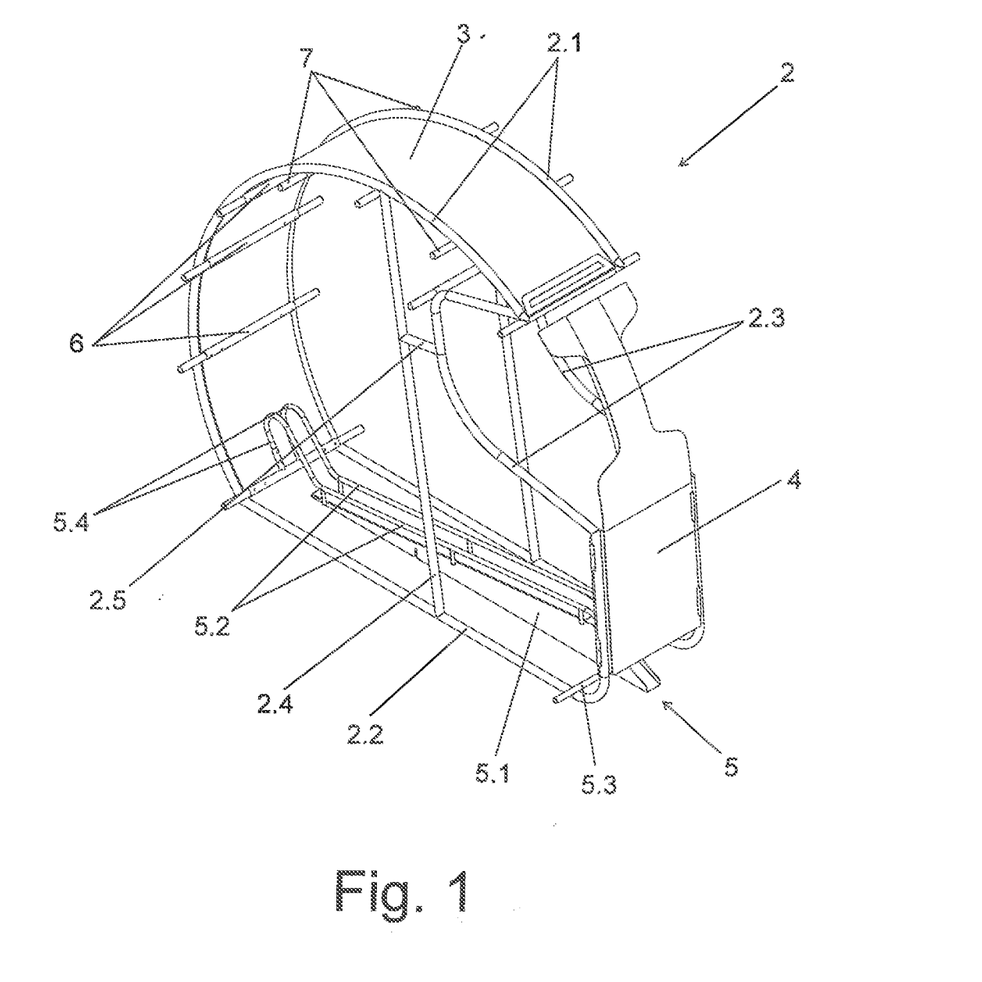
FIG. 1 shows a perspective view of one of the compartments forming the modular parking place for bicycles object of the invention.
Figure 1A:
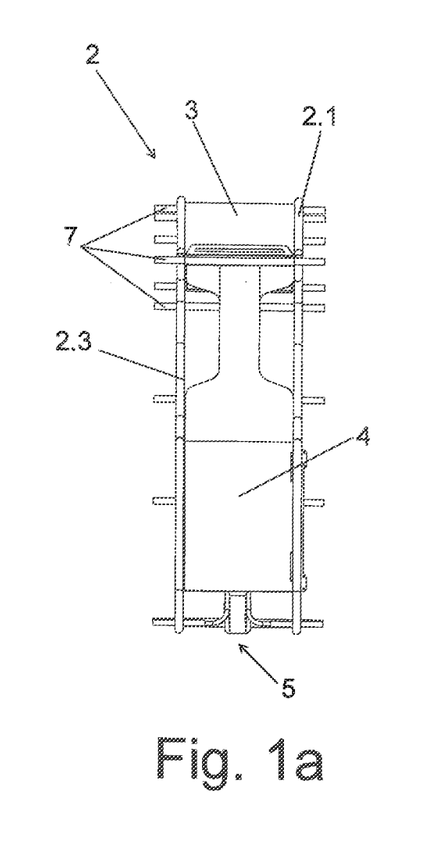
FIG. 1a shows a front view of the compartment depicted in FIG. 1.
Figure 2:
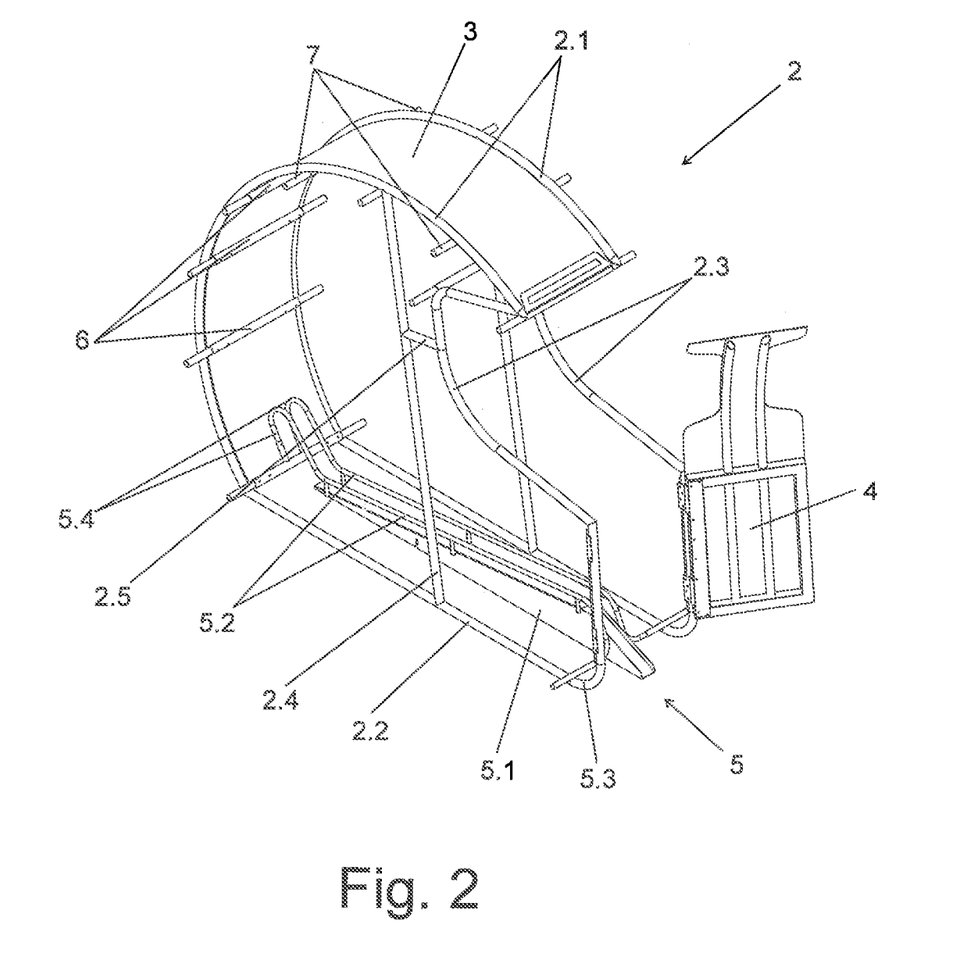
FIG. 2 shows a perspective view of a compartment with the front door open for housing a bicycle.

The modular parking place of the invention is formed by a structure or frame which serves to house bicycles (1) therein and safeguard them against adverse environmental conditions, theft or acts of vandalism. Said structure is formed by one or more compartments (2), where each compartment (2) houses a single bicycle (1); the bicycles (1) are therefore kept isolated and protected from damage when a user is accessing another bicycle (1) in a contiguous compartment (2). The perspective views of FIGS. 1 and 2 show a compartment (2) of the modular parking place according to the invention.

Each compartment (2) of the modular parking place is formed by a protective cover (3) protecting the bicycle (1) from adverse meteorological actions. To be able to access the inside of the modular parking place, each compartment (2) has on its front portion a side-opening front door (4), through which the bicycle (1) is introduced. A longitudinal channel (5) guiding the bicycle (1) when it is introduced into the compartment (2) is arranged in the lower portion of the compartment (2) on the ground. Likewise, the longitudinal channel (5) keeps the bicycle (1) in the vertical position, preventing it from falling while the bicycle remains inside its respective compartment (2).

The protective cover (3) has a series of transverse reinforcement bars (6) along its entire length which are arranged perpendicular to said protective cover (3), providing it with rigidity. Likewise, the transverse reinforcement bars (6) act as an attachment between two sets of symmetrical tubular profiles parallel to one another, said tubular profiles forming the frame of each compartment (2).

Each of the sets of tubular profiles defining a compartment (2) is formed by an arched section (2.1) extending parallel to the protective cover (3), a lower longitudinal section (2.2) performing the function of supporting the compartment (2) on the ground, and a C-shaped front section (2.3). As is seen in detail in FIG. 4, the C-shaped front section (2.3) performs a dual function; on one hand it abuts with the handlebar of the bicycle (1), preventing it from falling backwards when it is inside the compartment (2), and on the other hand it has a hinge (4.1) to establish an articulated attachment with the front door (4).

A reinforcement bar (2.4) is arranged between the arched section (2.1) and the lower longitudinal section (2.2) of each set of tubular profiles. This reinforcement bar (2.4) provides rigidity to the structure of the compartment (2) and supports the weight of the protective cover (3) to a large extent. Additionally, to increase the rigidity of the compartment (2), this reinforcement bar (2.4) is attached to the C-shaped front section (2.3) by means of an auxiliary section (2.5).

Figure 7:
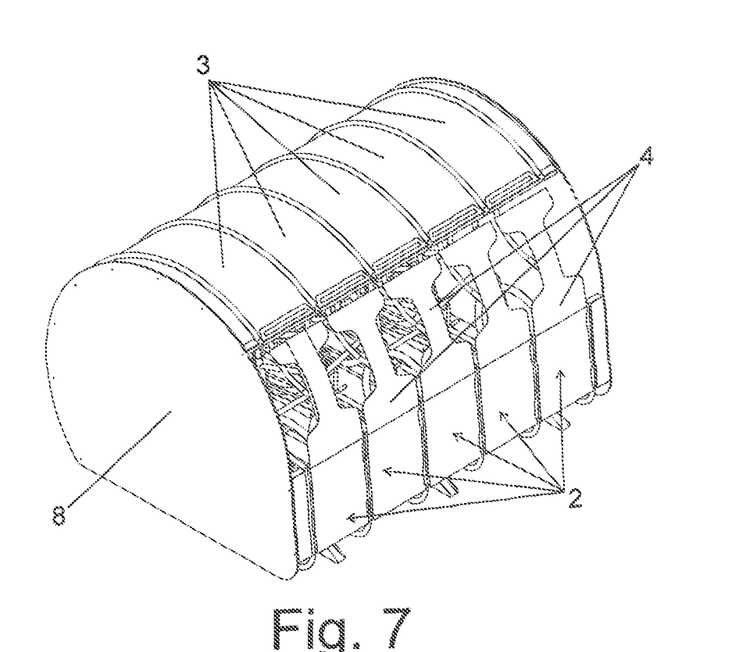
FIGS. 7 and 8 show a perspective view and a front view, respectively, of the modular bicycle parking place formed by a set of compartments coupled in parallel.
Figure 8:
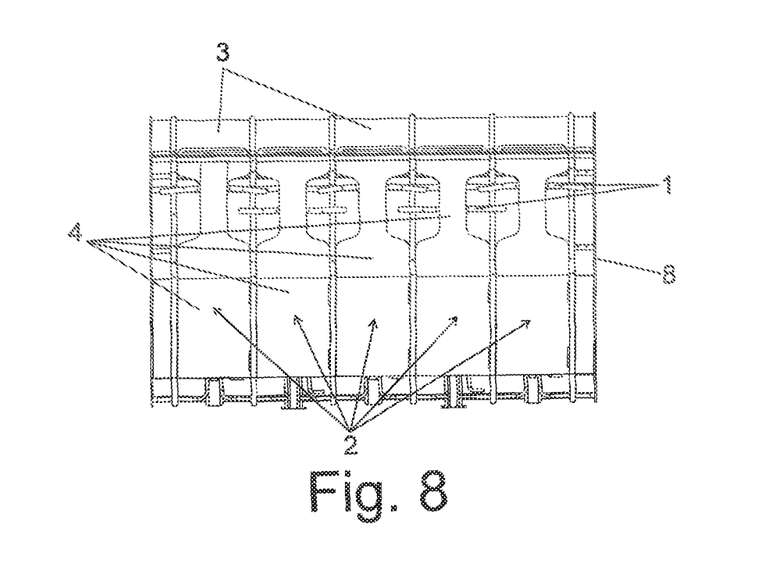
Figure 9:
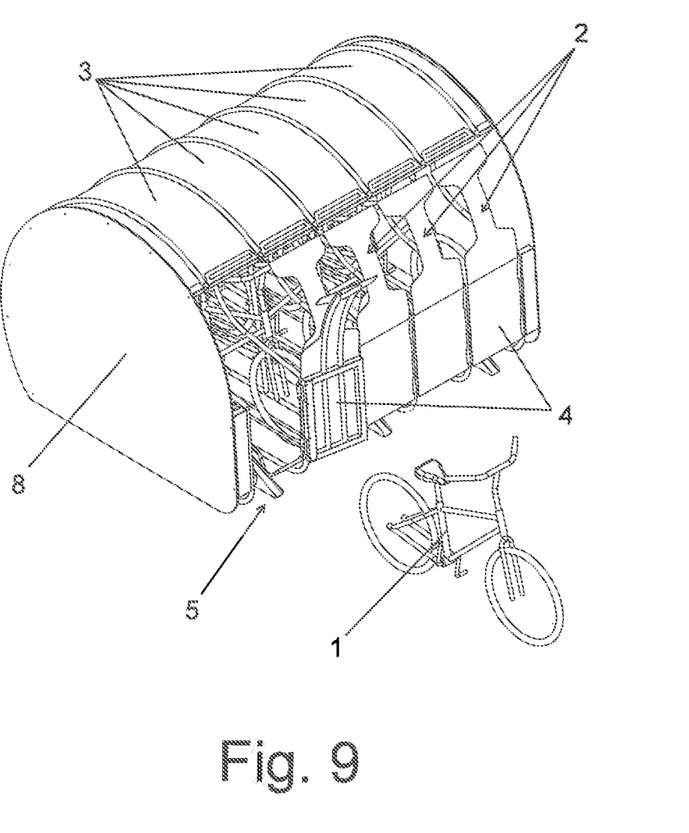
FIG. 9 shows a bicycle in a position for being introduced in one of the compartments of the modular parking place.

As seen in FIGS. 7 to 9, the modular bicycle parking place is scalable in width by means of coupling additional compartments (2) in parallel. This coupling in parallel is carried out by means of auxiliary parts (7) connecting the transverse reinforcement bars (6) of consecutive compartments (2). To that end, the transverse reinforcement bars (6) have a tube-like hollow interior to receive the auxiliary parts (7). The auxiliary parts (7) can be fixed to the transverse reinforcement bars (6) by means of screwing, riveting, snap-fitting, welding or another form of known attachment.

Figure 5:
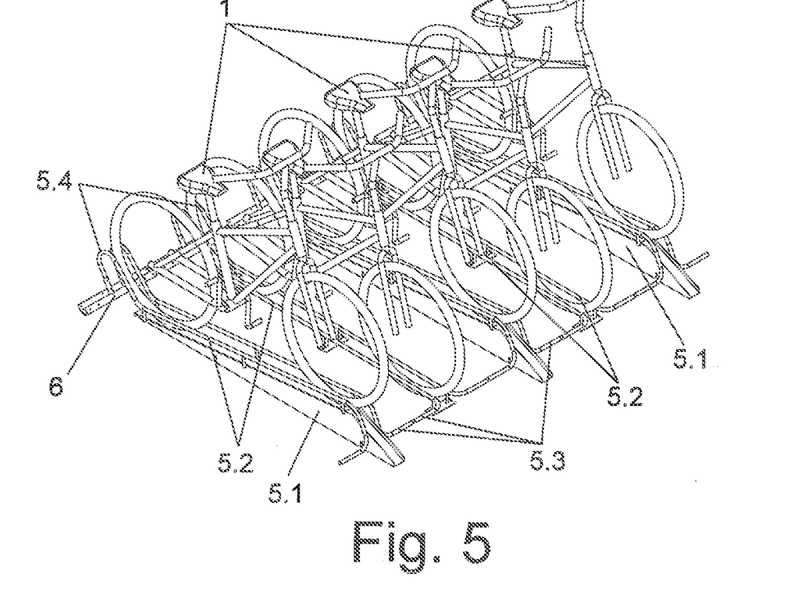
FIGS. 5 and 6 show a perspective view and a front view, respectively, of a set of bicycles arranged at different heights to prevent their handlebars from hitting against one another.
Figure 6:
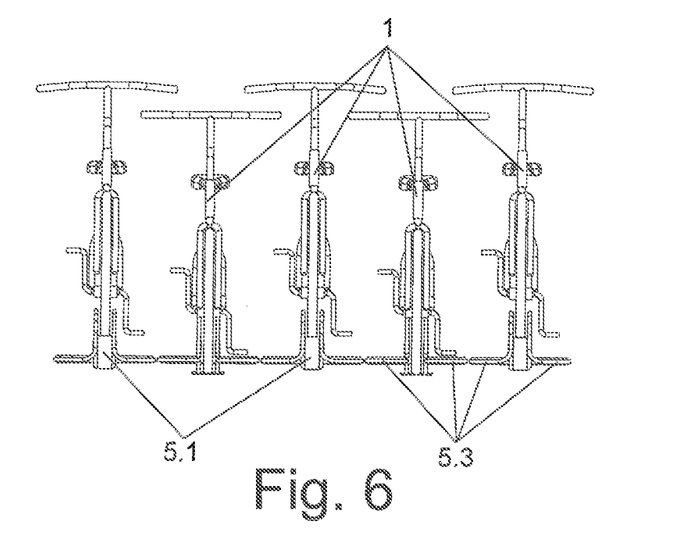

FIGS. 5 and 6 shows a set of bicycles (1) parked in their respective longitudinal channels (5); the protective cover (3), the front door (4), and the sets of tubular profiles defining the compartments (2) are not depicted in these drawings to be able to clearly view this arrangement.

Two possible configurations for the longitudinal channels (5) have been envisaged for being able to arrange the handlebars of the bicycles (1) at different heights and prevent them from hitting against one another.

As seen in detail in any of FIGS. 1 to 5, a first configuration allows positioning the bicycle (1) in an inclined position with the front wheel of the bicycle (1) being elevated. In this case, the longitudinal channel (5) is formed by an inclined ramp (5.1) having a progressive elevation from the rear portion of the compartment (2) towards the front portion where the front door (4) is located. The longitudinal channel (5) also has two side bars (5.2) parallel to said inclined ramp (5.1), the front portion of these side bars (5.2) ending in diverging horizontal sections (5.3), while the rear end thereof end in inverted U-shaped vertical sections (5.4) where the rear wheel of the bicycle (1) is supported.

In another configuration, the longitudinal channel (5) does not have the inclined ramp (5.1); in this case, the side bars (5.2) are parallel to the ground. As can be seen in FIG. 5, the height of the side bars (5.2) with respect to the ground or, where appropriate, with respect to the inclined ramp (5.2), is a height coinciding approximately with the thickness of the cover of a wheel of the bicycle (1). This is because these side bars (5.2) of the longitudinal channel (5) are envisaged to keep the bicycles (1) upright, for which purpose the side bars (5.2) must obviously be in contact with the tires of the wheels, but not be supported on the spokes thereof, since they could damage them.

The diverging shape of the horizontal sections (5.3) allows them to make contact with the lower longitudinal sections (2.2), providing stability to the front portion of the longitudinal channel (5); on the other hand, to provide stability to the rear portion of the longitudinal channel (5), the inverted U-shaped vertical sections (5.4) are supported on one of the transverse reinforcement bars (6).

As seen in detail in the FIG. 6, a compartment (2) with a longitudinal channel (5) without an inclined ramp (5.1) is arranged between every two compartments (2) with longitudinal channels (5) with an inclined ramp (5.1), such that the handlebars of the bicycles in every two consecutive compartments (2) are at different heights, which prevents the handlebars from hitting against one another.

Another possible configuration to prevent the handlebars of bicycles (1) arranged in consecutive compartments (2) from hitting against one another is based on arranging between every two compartments (2) with longitudinal channels (5) with an inclined ramp (5.1) a compartment (2) with a longitudinal channel (5) with an inclined ramp (5.1) of a different height with respect to the longitudinal channel (5) with an inclined ramp (5.1) of adjacent compartments (2). It has been found that the use of inclined ramps (5.1) with different inclinations between adjacent compartments (2) optimizes the positioning of bicycles (1) in the parking place.

Figure 4:
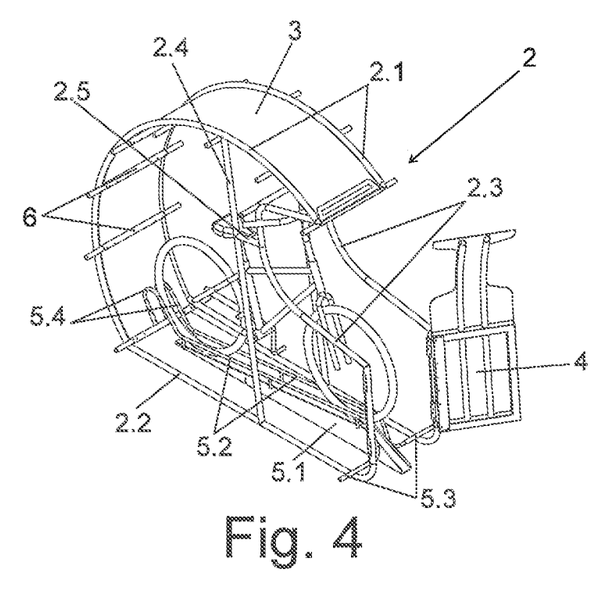
FIG. 4 is a perspective view showing how a bicycle is arranged inside its respective compartment.

As seen in FIG. 4 or 9, the bicycles (1) are introduced in the compartment (2) in a direction opposite the conventional riding direction, i.e., the rear wheel of the bicycle (1) is introduced first, whereby the bicycle (1) is correctly introduced when the handlebar abuts with the C-shaped front section (2.3) and the rear wheel of the bicycle (1) is supported between the inverted U-shaped vertical sections (5.4).

FIGS. 7 and 9 show how the set of compartments (2) coupled in parallel is closed by means of side cover plates (8) at the ends thereof. Said side cover plates (8) are attached to the compartment (2) through the transverse reinforcement bars (6), bolts or similar elements that go through the side cover plate (8) and fit into the hollow interior of said transverse reinforcement bars (6) being used to that end.

Figure 1B:
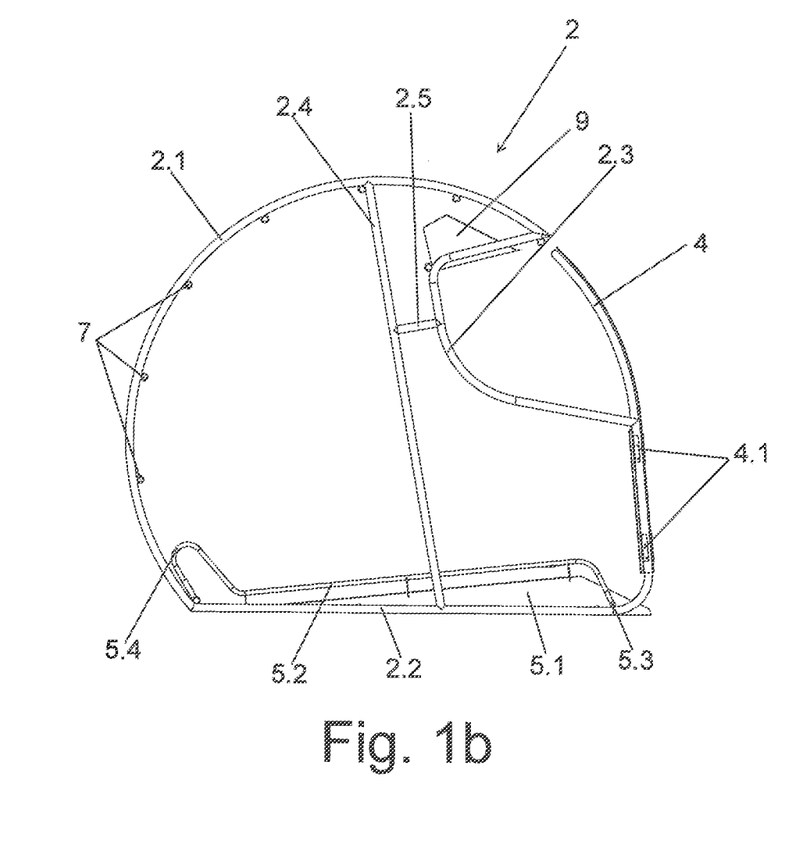
FIG. 1b shows a side view of the compartment depicted in FIG. 1.
Figure 2A:
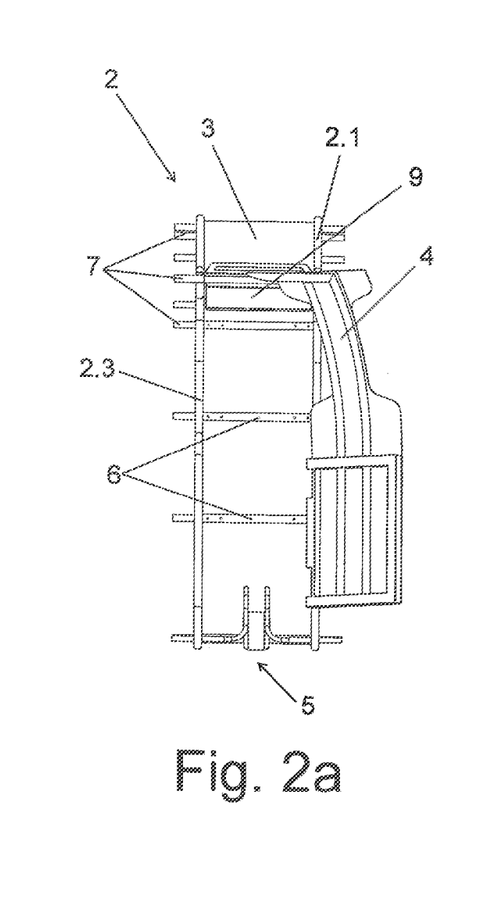
FIG. 2a shows a front view of the compartment depicted in FIG. 2.
Figure 2B:
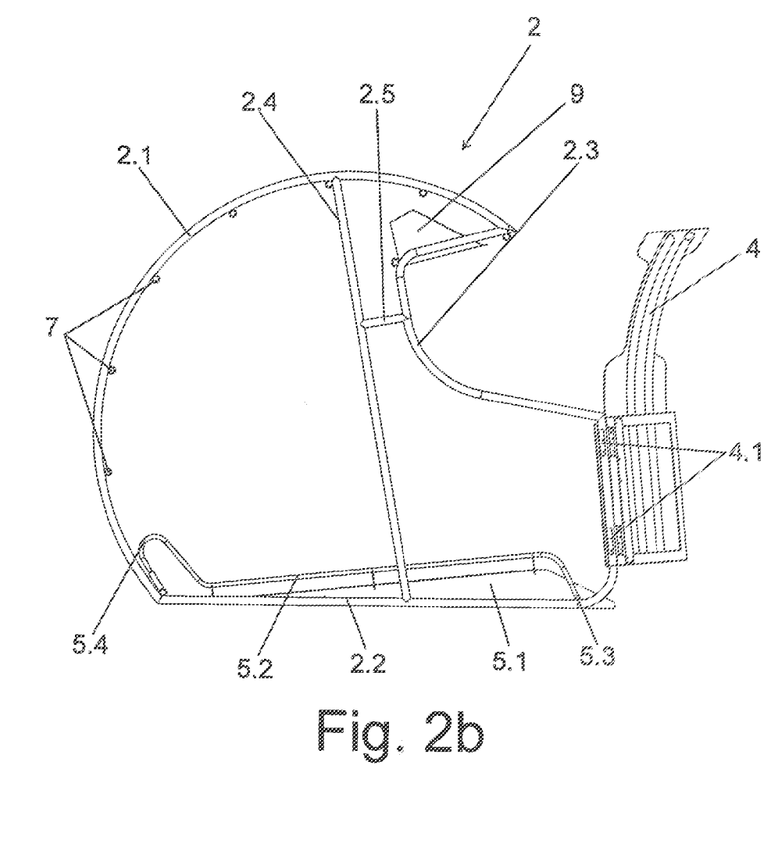
FIG. 2b shows a side view of the compartment depicted in FIG. 2.
Figure 3:
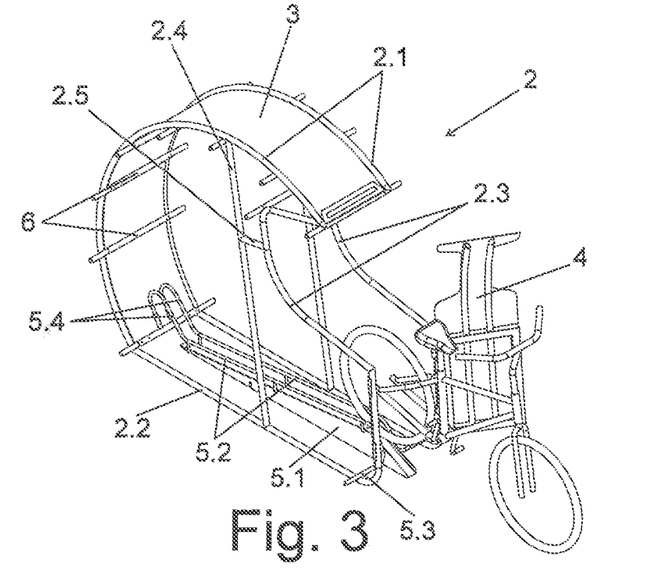
FIG. 3 shows a perspective view of the compartment of the preceding figures with a bicycle being introduced therein.

The possibility of providing a locker (9) inside the compartment (2) for housing personal belongings of the user of the bicycle (1), such as, for example, a helmet for riding the bicycle (1), has been envisaged. FIGS. 1b, 2a and 2b show how the locker (9) has a trapezoidal configuration and is arranged in the inner upper portion of the compartment (2)

secured between two C-shaped front sections (2.3), said locker (9) being suitably closed by means of the door (4).

The invention claimed is:

1. A modular parking place for bicycles, comprising a structure for housing and securing the bicycles, wherein the structure is formed by one or more compartments, each compartment for housing a bicycle, each compartment formed by two sets of symmetrical profiles parallel to one another, between which a protective cover is arranged on an upper portion and a door is arranged on a front portion, while a lower portion of each compartment has a longitudinal channel for supporting and guiding bicycles, the one or more compartments is closed by means of side cover plates at the ends thereof, each set of symmetrical profiles of the compartments comprises an arched section extending parallel to the protective cover, a lower longitudinal section being supported on the ground and a C-shaped front section on which the door is secured; and wherein the longitudinal channel is defined with an inclined ramp and two side bars parallel to said inclined ramp, with a front end of the two side bars ending in diverging horizontal sections and a rear end of the two side bars ending in inverted U-shaped vertical sections.

2. The modular parking place for bicycles according to claim 1, wherein the sets of symmetrical profiles of each compartment are attached to one another by means of transverse reinforcement bars.

3. The modular parking place for bicycles according to claim 1, wherein each set of symmetrical profiles of the compartments has a reinforcement bar arranged between the arched section and the lower longitudinal section.

4. The modular parking place for bicycles according to claim 1, wherein the compartments are consecutively defined side by side, with a set of common symmetrical profiles between adjacent compartments.

5. The modular parking place for bicycles according to claim 1, wherein an attachment is established between adjacent compartments by means of auxiliary parts connecting respective transverse reinforcement bars.

6. The modular parking place for bicycles according to claim 1, wherein the longitudinal channel is defined by two side bars parallel to the ground, with a front end ending in diverging horizontal sections and a rear end ending in inverted U-shaped vertical sections.

7. The modular parking place for bicycles according to claim 1, wherein the consecutive compartments are alternatively defined with a longitudinal channel provided with an inclined ramp and with a longitudinal channel provided with an inclined ramp of a different height with respect to the longitudinal channel provided with an inclined ramp of the adjacent compartment.

8. The modular parking place for bicycles according to claim 1, wherein the compartment internally has a locker for housing personal belongings of the user of the bicycle.

* * * * *